Oct. 13, 1936.   H. FELDMEIER   2,057,298
HEAT EXCHANGE DEVICE
Filed Feb. 4, 1935   4 Sheets-Sheet 1

INVENTOR.
Harvey Feldmeier
by Parker, Prochnow & Farmer
ATTORNEYS.

Oct. 13, 1936.  H. FELDMEIER  2,057,298
HEAT EXCHANGE DEVICE
Filed Feb. 4, 1935   4 Sheets-Sheet 2

INVENTOR.
Harvey Feldmeier
by Parker, Prochnow & Farmer
ATTORNEYS.

Oct. 13, 1936.     H. FELDMEIER     2,057,298
HEAT EXCHANGE DEVICE
Filed Feb. 4, 1935     4 Sheets—Sheet 3
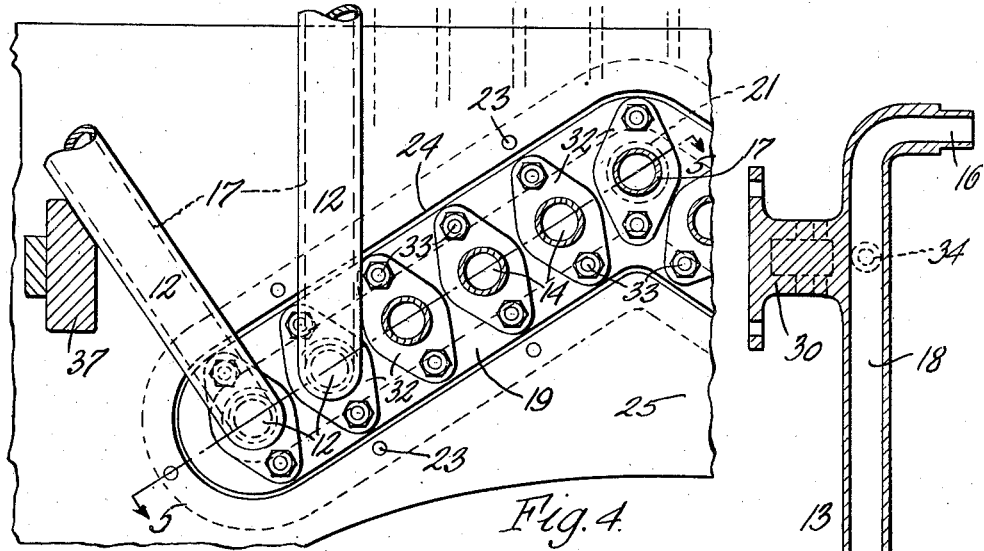
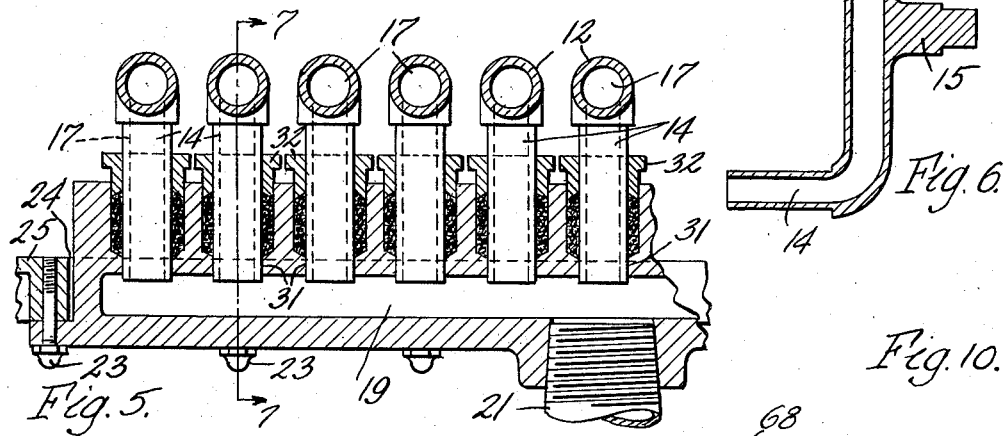
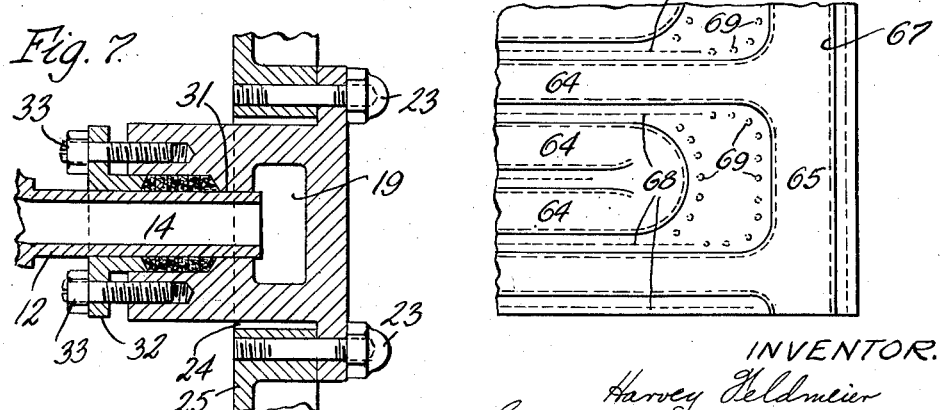
INVENTOR.
Harvey Feldmeier
by Parker, Prochnow & Farmer
ATTORNEYS.

INVENTOR.
Harvey Feldmeier
by Parker, Prochnow & Harmer
ATTORNEYS.

Patented Oct. 13, 1936

2,057,298

UNITED STATES PATENT OFFICE 2,057,298

HEAT EXCHANGE DEVICE

Harvey Feldmeier, Little Falls, N. Y., assignor to Cherry-Burrell Corporation, Wilmington, Del., a corporation of Delaware Application February 4, 1935, Serial No. 4,783

19 Claims. (Cl. 257—184)

This invention relates to heat exchange devices for cooling or heating liquids, such as milk, and more particularly to improvements in surface liquid coolers or heaters of the type disclosed in United States Letters Patent No. 1,840,573, granted January 12, 1932 to Harvey Feldmeier, assignor, which comprise a plurality of heat exchange sections or units over which the liquid flows in heat exchange relation to a heating or cooling medium circulating through the sections, and which sections normally stand side by side close together and operate simultaneously on a plurality of streams or films of the liquid, whereby a small, compact apparatus will have a large capacity, while nevertheless the sections are movably mounted so that they can be readily separated or spread apart to facilitate access to them for cleaning or other purposes.

For the sake of clarity and brevity of description, the liquid to be cooled or heated and the cooling or heating medium are designated herein respectively "milk" and the "heat exchange medium", but it is not thereby intended to restrict the invention to use with milk or any particular heat exchange medium except where it is apparent from the context that such is the intention.

One object of the invention is to provide a heat exchange device of the type mentioned, which is of novel and desirable construction and will be efficient in operation.

Other objects of the invention are to provide a heat exchange device which comprises a plurality of heat exchange sections arranged to swing about horizontal axes or in vertical planes transverse to the sections to and from their close side by side operative positions; in which the sections are pivotally mounted by horizontal hinges which form flow connections for the heat exchange medium; in which the horizontally hinged sections have flow connections for the heat exchange medium comprising movable portions which permit the hinging movements of the sections; in which the sections are arranged in superposed tiers each comprising relatively movable sections and the sections of at least one tier are pivotally mounted and those of another tier are differently mounted; in which the sections are arranged in superposed tiers and the sections of at least one tier are hinged to swing about horizontal axes or in transverse vertical planes to and from their operative positions; which comprises superposed tiers of relatively movable sections and in which the sections of one tier at least are movable retilinearly toward and from each other and the sections of another tier are pivotally movable toward and from each other; in which the relatively movable sections are arranged in superposed tiers and the sections in one tier, at least, have flow connections including connected relatively movable parts for the heat exchange medium, and the flow connections for the heat exchange medium for the sections of another tier include separable parts; and which embodies the other features of improvement and advantage hereinafter described and set forth in the claims.

In the accompanying drawings:

Fig. 4 is a transverse sectional elevation, enlarged, on line 4—4, Fig. 2.

Fig. 5 is a longitudinal section on line 5—5, Fig. 4.

Fig. 6 is a section of the outlet header for the stationary central heat exchange section.

Fig. 7 is a section of one of the swivel fluid connections for the sections, on line 7—7, Fig. 5.

Fig. 8 is a longitudinal sectional elevation showing another embodiment of the invention.

Figs. 10 and 11 are respectively a fragmentary front elevation and longitudinal section on an enlarged scale, of one of the heat exchange sections of the device shown in Figs. 8 and 9.

Figure 1:
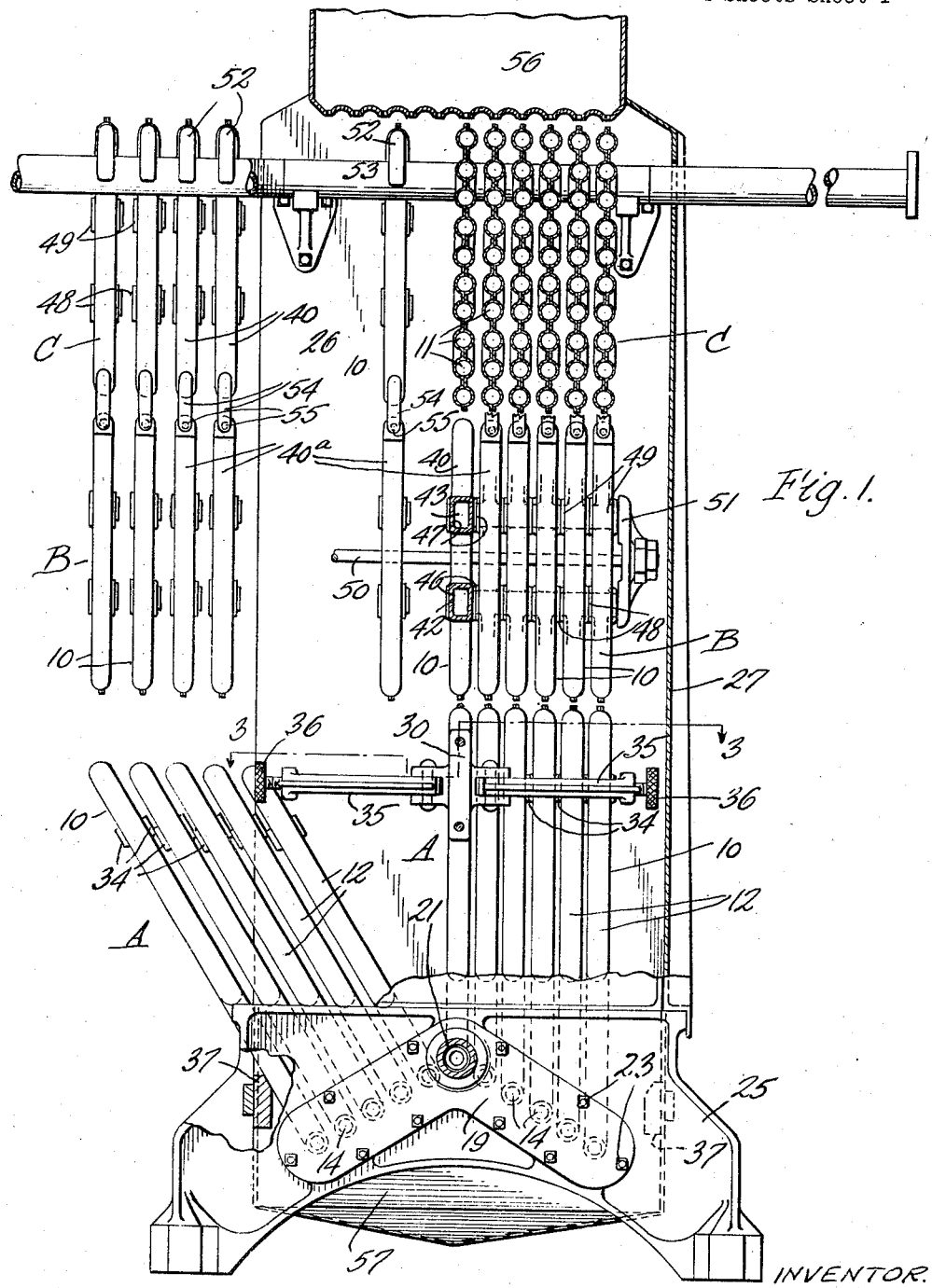
Fig. 1 is a transverse sectional elevation of a heat exchange device of one construction embodying my invention, showing the enclosing cabinet partly in section and some of the heat exchange sections therein in elevation and some in section.

The device illustrated in Figs. 1–7 as one practical embodiment of the invention comprises a plurality of heat exchange sections or units 10 arranged to normally stand side by side close together within an enclosing cabinet, the sections being preferably arranged in superposed tiers A, B, C, each comprising a plurality of the sections, with the sections in different tiers vertically alined. Each section preferably consists of a surface liquid cooler or heater element which may be of any suitable construction chambered for the circulation of the heat exchange medium and over which the milk flows externally. As shown, each section is formed with superposed horizontal tubes or passages 11 connected at their ends to form a continuous zigzag passage for the circulation of the heat exchange medium through the section.

The sections 10 of at least one tier, preferably the bottom tier A, are hinged or mounted to swing toward and from each other about horizontal axes or in vertical planes transverse to the sections, and are connected with the supply or circulating means for the heat exchange medium by suitable connections which allow such swinging of the sections, while the sections of the other tier or tiers may be similarly or differently mounted for movement toward and from each other.

In the construction shown in Figs. 1 to 7, each section 10 in the lower tier A is provided at one end with a supporting inlet header or member 12 and at its opposite end with a supporting outlet header or member 13. The opposite headers 12 and 13 for each section are provided at their lower ends with alined horizontal hollow journal portions 14, and each header is provided with arms 15 and 16 which are rigidly attached respectively to the lower and upper portions of the section 10. The opposite headers 12 and 13 are similar except that one, for example the inlet header 12, has a passage 17 extending from its hollow journal through its lower arm 15 and communicating with the lower end of the circulating passage of the section 10, while the passage 18 in the other or outlet header 13 extends from its journal 14 through its upper arm 16 and connects with the upper end of the circulating passage in the section 10. The upper arm 16 of one header 12 is solid or plugged, while the lower arm 15 of the other header 13 is solid or plugged so that the passage of one header communicates only with the lower end of the circulating passage of the section 10, and the passage of the other header communicates only with the upper end of the circulating passage of the section.

The journals 14 of the inlet headers for the several sections of the lower tier A connect with a supply manifold 19 at one end of the sections, and the journals 14 of the outlet headers for said sections connect with an outlet manifold 20 at the opposite ends of the sections. A supply pipe 21 connects with the supply manifold 19, preferably at its outer side, and an outlet pipe 22 connects with the outlet manifold preferably at its outer side, so that a heat exchange medium supplied by pipe 21 to the supply manifold 19 will pass through the inlet headers 12 to and circulate through the several sections 10 and will pass therefrom through the outlet headers 13 and the outlet manifold 20 to the pipe 22.

The supply and outlet manifolds 19 and 20, as shown, consist of hollow castings of inverted V-shape secured, as by bolts 23, in inverted V-shape openings 24 in the opposite ends of the base 25 of the supporting frame. This frame base is preferably, as shown, of substantially rectangular shape in plan, and forms the base of a cabinet which encloses the heat exchange sections of the apparatus, and as shown includes vertical end panels 26 secured on and rising from the end walls of the base and opposite removable side or front and rear panels 27.

The central section 10 of the lower tier is preferably stationarily secured in place while the remaining sections at opposite sides of the central section are pivotally mounted by means of their journals 14 to swing about the horizontal axes of the journals toward and from the central section. For securing the central section, the inlet and outlet headers 12 and 13 may be provided with fixed brackets 30 which are bolted to the end panels 26 of the cabinet. Otherwise the headers of the central and other sections 10 are similar except that the headers are of graduated lengths between their journals and lower arms 15 so that the sections may be pivotally mounted in stepped formation, as shown, while nevertheless all of the sections will stand at the same level in their operative positions. The hollow journals 14 of the several headers at one end of the sections extend into cylindrical bores 31 in the supply manifold, and the journals 14 of the opposite headers similarly extend into cylindrical bores in the outlet manifold 20, the joints between the journals and the manifolds being suitably packed, as by packing glands 32, through which the journals extend and which may be adjustably secured, as by screws 33, against the packing in the enlarged outer portions of the bores 31. Fluid-tight, hollow swivel joints are thus provided between each section and the supply and discharge headers and, with the exception of the stationarily secured central section, the sections are adapted to swing to turn about these joints relatively to each other and toward and from the central section. The described swivel joints are suitable for the use of direct expansion ammonia as a cooling medium in the lower tier of sections.

The swinging sections are releasably held in their operative side by side positions with each section in its proper intended position relative to the other sections and to the milk distributing means, for which purpose, as shown, the headers at the opposite ends of the sections are provided with bosses 34 adapted to abut end to end in the operative positions of the sections, and two clamp arms 35, suitably pivoted to the bracket 30 of each header for the stationary central section, are provided at their laterally extending free ends with thumb screws 36 adapted to bear at their inner ends in shallow seats in the bosses on the two outermost sections. By swinging the clamp arms to aline the thumb screws with the seats and tightening the thumb screws, the several sections are clamped together and securely held stationarily in their operative positions. When it is desired to spread or open up the sections for access thereto, the thumb screws are loosened and the clamp arms swung back to release the sections. The sections 10 may be supported in outwardly inclined positions, as shown at the left side of Fig. 1, by suitable means, such as bars 37 fixed to and extending lengthwise at opposite sides of the cabinet base in position for the two outermost sections to rest in outwardly inclined positions against these bars. The two outermost sections thus supported, serve to support the other sections when they are swung to their open inclined positions.

Following the usual practice, the sections 10 are, as before stated, disposed in superposed tiers to enable the use of one heat exchange medium in the sections of one tier, and a different medium or medium of different temperature in other tier or tiers so that the milk flowing down over the sections of the different tiers in succession can be treated in successive stages. For example, the milk can be cooled first by service or well water, then by refrigerated water and then by ammonia in the successive tiers of sections. The sections in all of the tiers could be constructed and mounted to swing like those of the bottom tier. In the device shown, however, the sections in each of the upper tiers B and C are mounted to slide or move rectilinearly instead of swinging to and from their operative positions in which the sections of one tier are vertically alined with the corresponding sections of the next tier. The sections 10 in each tier B and C may be similar to the sections of the bottom tier, except as to the mounting thereof and the flow connections for the heat exchange medium to the sections. Instead of inlet and outlet headers or members 12 and 13, before described, at opposite ends of each section, each section is provided at one end with a header or member 40 provided with upper and lower tubular arms or portions connected respectively with the upper and lower ends of the circulating passage 11 of the section. The header 40 for the central section of each tier B and C may be stationarily secured to the adjacent end panel of the cabinet, as by outwardly projecting supply and discharge fittings 42 and 43 which extend through holes in the end panel of the cabinet and connect with supply and discharge pipes for the heat exchange medium. The opposite end of the section may be stationarily secured by brackets 41 projecting from the section and bolted to the adjacent end panel of the cabinet. The header 40 for the central section is provided with an inlet passage 44 leading from the supply fitting 42 to the lower end of the circulating passage 11 of the section, and with an outlet passage 45 leading from the discharge fitting 43 to the upper end of the circulating passage 11. In addition, the header 40 for the central section is provided at opposite sides thereof with lateral ports 46 and 47, one communicating with the inlet passage 44 and the other with the outlet passage 45 of the header. Each supply header 40a of the remaining sections in each tier B or C is provided at opposite sides with lateral ports 48 and 49 and also with an inlet passage connecting the ports 48 to the lower end of the circulating passage of the section, and an outlet passage connecting the ports 49 with the upper end of the circulating passage. The lateral ports of the central and other sections in each tier are alined and are adapted, when joined end to end, to form separable flow connections from each section to the next adjacent section, so that by clamping the several sections of the tier together, the heat exchange medium can circulate from the supply fitting 42 of the central section through all of the sections and discharge through the discharge fitting 43 of the central section. The sections of the tier may be clamped together by suitable means, such as screw bolts or rods 50 passing through holes in the headers 40 and 40a of the sections, and provided with clamping heads 51 at their opposite ends adapted to bear against the headers of the outermost sections in alinement with the lateral ports of the sections. Packing gaskets or means of any suitable sort are provided between the separable port members of the sections to form fluid-tight joints between these members when the sections are clamped together.

For slidably or movably mounting the sections of the tiers B and C, the movable sections of the top tier C are provided at their opposite ends with fixed supporting lugs 52 adapted to slide on stationary tracks or guide rods 53 stationarily supported in the cabinet or frame so that when the sections are un- clamped, they can slide bodily relatively to each other and toward and from the central section on the guide tracks. The movable sections of the next tier B are preferably hinged to or pivotally hung from the sections of the top tier as, for instance, by hinge sockets 54 at opposite ends of the sections of the second tier near their top edges adapted to removably receive horizontal pivots 55 on lugs at the lower edge portion of the opposite ends of the sections of the top tier. The movable sections of the second tier are thus carried by and move with the sections of the top tier, but they are adapted, in addition to swing or pivot on the sections of the top tier and are also adapted to be removed therefrom by disengaging the pivots 55 from the sockets 54 so that each section of the second tier can, if desired, be independently swung in and out relatively to the other sections or detached and removed. The several sections are thus rendered readily accessible for thorough cleaning. The pivotal connections between the sliding sections in adjacent tiers also give flexibility between them, ensuring tight joints between the separable port members of all of the sections when the sections are clamped together.

In the operation of this device, as in that of the before mentioned patent, the milk is delivered, as from a suitable overhead trough or distributor 56 having discharge openings or perforations over the several sections 10 of the top tier, so that the milk will flow simultaneously down over the outer surfaces of the several sections 10 of the top tier, and from these in succession over the sections in the tiers below and fall into a receiver or bottom trough 57 below the bottom tier. The distributor and receiver may be constructed and arranged in this device in any suitable manner. As shown, the distributing trough 56 is supported by the end panels and forms the top of the enclosing cabinet for the heat exchange sections. When access to the sections is desired for cleaning or other purposes, the side panels are unfastened and moved outwardly on the tracks as guide supports, to expose the heat exchange sections, which then can be released and moved out individually or collectively through the open front and back of the cabinet, as indicated at the left in Fig. 1, to give the required access to the sections.

By mounting the hinged sections by means of horizontal hinges, as described, the hinges, which form the swivel flow connections for the heat exchange medium, are subject to less strain and wear than the hinges in constructions in which the sections swing on vertical hinges which are more or less subject to the overhanging weight of the sections. The horizontal hinges are therefore less liable to leakage and consequently more desirable, particularly when using ammonia as the cooling medium.

While the device illustrated is a multiple tier construction in which the horizontally hinged sections constitute only the bottom tier, a complete heat exchange device could be constructed with the horizontally hinged sections of suitable proportions arranged in a single tier, or the device could comprise multiple tiers of sections all constructed and hinged like the bottom tier sections herein described.

Figures 8, 11:
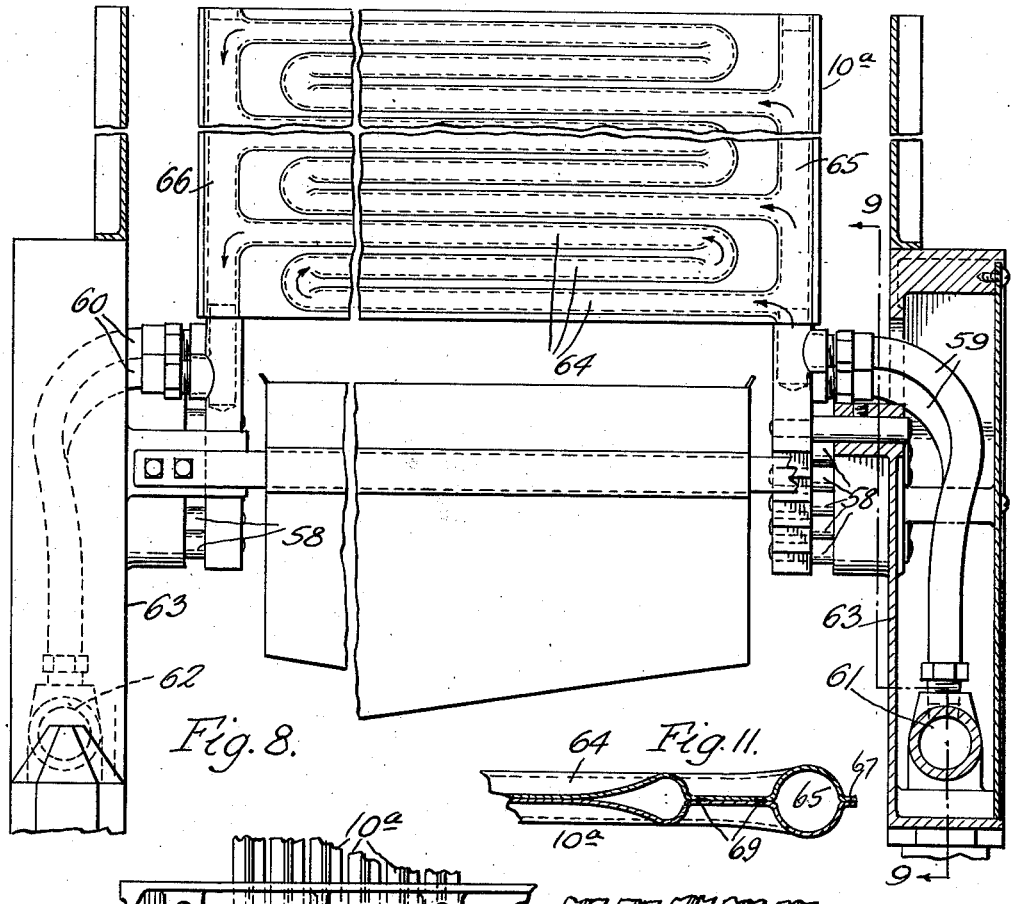
Figure 9:
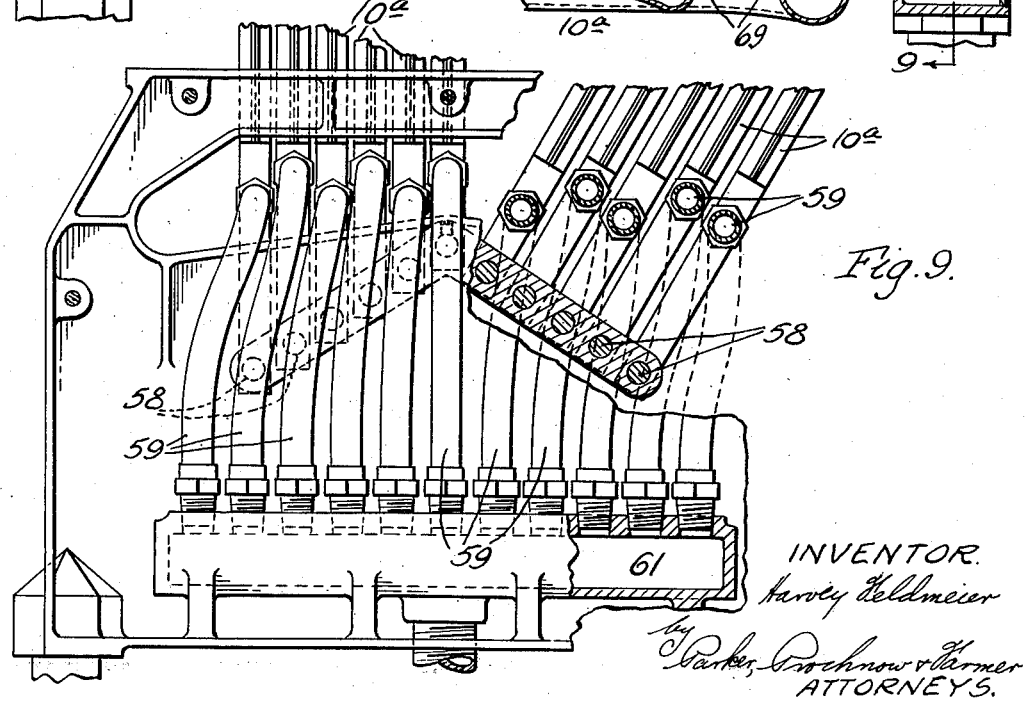
Fig. 9 is an end elevation thereof, partly in section, on line 9—9, Fig. 8.

Figs. 8 and 9 illustrate another embodiment of the invention in which, instead of mounting the sections 10 by means of hollow hinges which form swivel flow connections for the heat exchange medium, as above described, the sections are differently mounted to swing in vertical planes transverse to the sections, and flow connections of a different sort for the heat exchange medium are employed. As shown in these Figs. 8 and 9, the sections 10a are mounted by pivots or hinges 58 of any suitable kind, on the ends of the cabinet base, and the heat exchange medium is delivered to and discharged from the circulating passages of the several sections by means of flexible tubes or hoses 59 and 60 of metal or other suitable material connecting each section with supply and discharge manifolds or headers 61, 62. These manifolds are shown located in chambers in the ends 63 of the cabinet base which are provided with removable cover plates to give access to the flow connections. Otherwise this device may be constructed and operate substantially like the construction before described.

Figure 2:
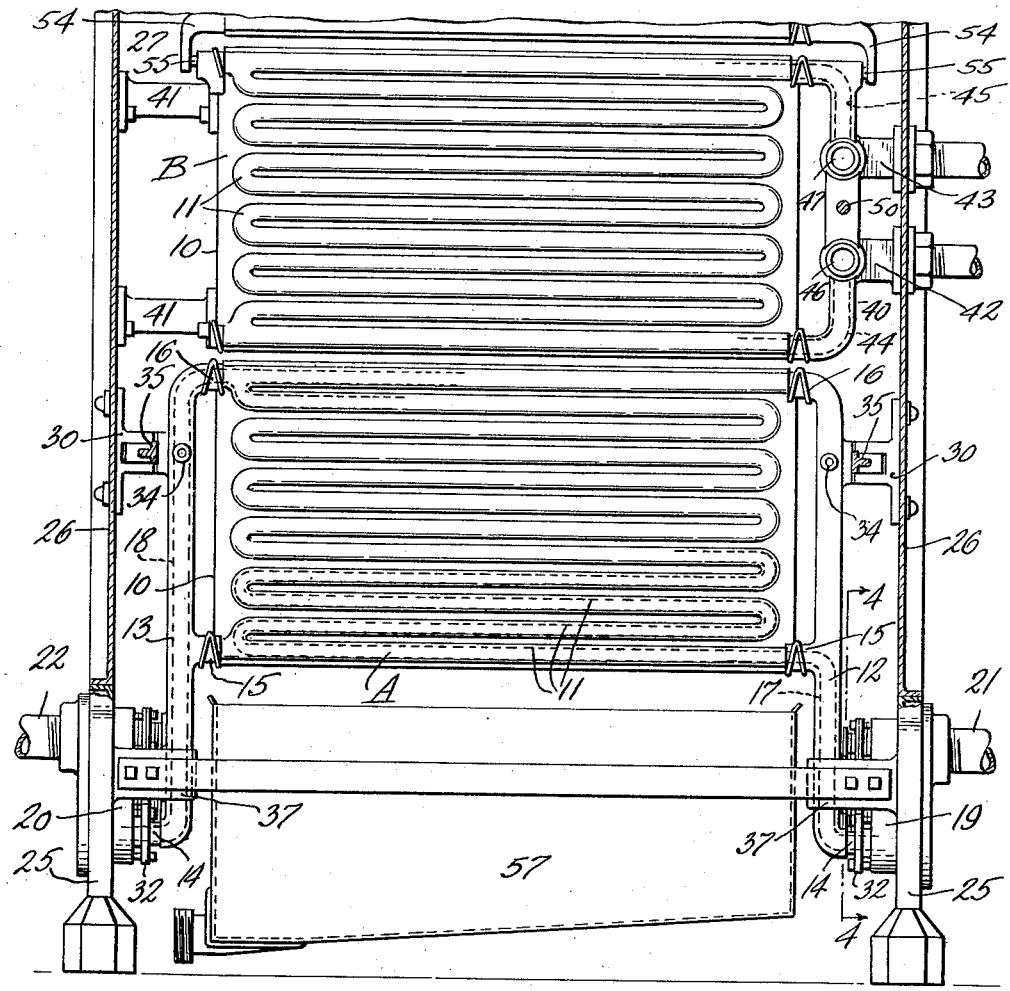
Fig. 2 is a view showing the cabinet partly in longitudinal sectional elevation and the sections in elevation.
Figure 3:
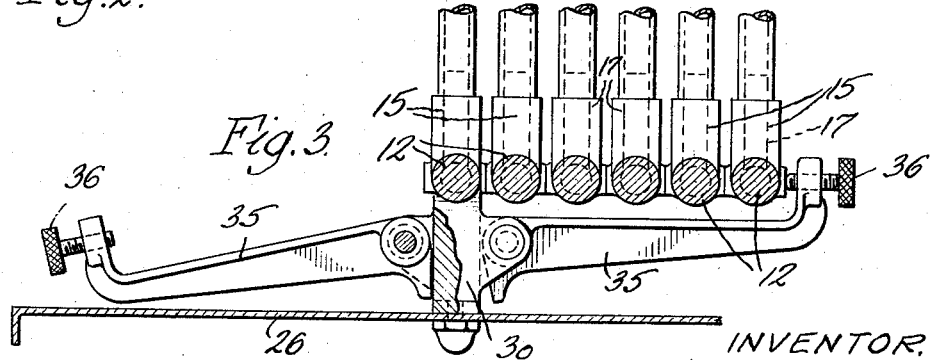
Fig. 3 is an enlarged sectional plan of the clamping device on line 3—3, Fig. 1.

The heat exchange sections 10a shown in this modification however, while being of embossed or pressed sheet metal construction, are of a form different from the sections shown in Figs. 1 and 2. Each section 10a is made of two sheet metal plates welded together, these plates being embossed or otherwise fabricated with grooves which, when the plates are welded together, form parallel horizontal circulating passages 64 and vertical supply and outlet header passages 65, 66, at opposite end portions of the section. As shown, the circulating passages 64 are connected end to end in groups of three and one end of each group connects with one header passage 65 and the opposite end of each group connects with the other header passage 66. This grouping and the use of header passages of larger diameter gives freer exit for the gas and makes this construction especially desirable for direct expansion cooling with ammonia or the like. As best shown in Figs. 10 and 11, the plates forming the section 10a are welded or secured together by continuous electric line welds 67 at the ends of the section, and 68 between the circulating passages, and spot welds 69 around the bends which join the passages of each group end to end.

I claim as my invention:

1. A heat exchanger for liquids such as milk comprising a plurality of sections hinged to swing about horizontal axes relatively to one another away from operative positions in which the sections stand close together side by side to positions which facilitate access to the several sections, delivery means for causing the liquid to flow over the surfaces of the several sections when in their standing operative position, and means which supply a heat exchange medium to the several sections and are operable to permit said swinging movements of the sections.

2. A heat exchanger for liquids such as milk comprising a plurality of sections hinged at their lower portions to swing about horizontal axes relatively to one another away from operative positions in which the sections stand close together side by side to positions which facilitate access to the several sections, delivery means for causing the liquid to flow over the surfaces of the several sections when in their standing operative positions, a supply means for a heat exchange medium, and hollow connections with movable portions which provide flow passages between said supply means and the several sections.

3. A heat exchanger for liquids such as milk comprising a plurality of sections, hollow hinge connections by which said sections are mounted to swing about horizontal axes relatively to one another away from positions in which the sections stand close together side by side to positions which facilitate access to the several sections, means for delivering the liquid to the several sections when in their operative positions, and supply means for a heat exchange medium, said hollow hinge connections providing passages for the heat exchange medium from said supply means to the several sections.

4. A heat exchanger for liquids such as milk comprising a plurality of normally upright sections mounted for their upper portions to swing in vertical planes transverse to the sections to and from operative positions in which the sections stand close together side by side, means for flowing the liquid over the several sections when in their operative position, and supply means for a heat exchange medium including connections to the several sections constructed with movable portions which permit said swinging movements of said sections.

5. A heat exchanger for liquids such as milk comprising a plurality of normally upright sections hinged at their lower ends to swing about horizontal axes relatively to one another to and from operative positions in which the sections stand close together side by side, means for flowing the liquid over the several sections when in their operative position, and supply means for a heat exchange medium including connections to said several sections constructed with movable portions which permit said swinging movements of said sections.

6. A heat exchanger for liquids such as milk comprising a plurality of normally upright sections, a supply manifold for a heat exchange medium, hollow hinges by which said sections are hinged at their lower ends to said manifold to swing about horizontal axes to and from operative positions in which the sections stand close together side by side, said hollow hinges forming flow passages for the heat exchange medium from said manifold to the several sections, and means for flowing the liquid over the several sections.

7. A heat exchanger for liquids such as milk comprising a plurality of sections which in operative position stand close together side by side, supply and discharge manifolds for a heat exchange medium arranged at opposite ends of said sections, hollow hinge connections between each manifold and the adjacent ends of the several sections adjacent the lower edges of the sections, said hollow connections forming passages for the flow of the heat exchange medium between said sections and said manifolds, and means for delivering the liquid to the several sections.

8. A heat exchanger for liquids such as milk comprising a plurality of normally upright sections mounted to swing in vertical planes transverse to the sections toward and from their normal positions in which the sections stand close together side by side, supply and discharge means for a heat exchange medium arranged respectively adjacent opposite upright ends of said sections and each including connections which lead to the several sections and have portions which are movable to permit the swinging of the sections, and means for delivering the liquid to the several sections.

9. A heat exchanger for liquids such as milk comprising superposed tiers of sections which normally stand upright close together side by side, said sections of one tier being arranged to swing toward and from each other in vertical planes transverse to the sections, and said sections of another tier being movable rectilinearly toward and from each other, supply means for a heat exchange medium for each tier of sections including connections to the several sections having movable parts permitting said movements of the sections, and means for delivering the liquid to the several sections.

10. A heat exchanger for liquids such as milk comprising superposed tiers of sections which normally stand upright close together side by side, said sections of the bottom tier being arranged to swing toward and from each other about horizontal axes and said sections of another tier being movable rectilinearly toward and from each other, supply means for a heat exchange medium for each tier of sections including connections to the several sections having movable parts permitting said movements of the sections, and means for delivering the liquid to the several sections.

11. A heat exchanger for liquids such as milk comprising superposed tiers of sections which normally stand upright close together side by side, said sections of one tier being arranged to swing toward and from each other in vertical planes transverse to the sections, and said sections of another tier being movable rectilinearly toward and from each other, supply means for a heat exchange medium for the tier of swinging sections including permanent connections with the several sections, supply means for a heat exchange medium for the other sections including separable connections between adjacent sections, and means for delivering the liquid to the several sections.

12. A heat exchanger for liquids such as milk comprising superposed tiers of sections, each tier comprising a plurality of sections which normally stand close together side by side, hollow hinges by which the sections of one tier are hinged to swing about horizontal axes toward and from each other, the sections of another tier being mounted to move rectilinearly toward and from each other, said hollow hinges forming passages for a heat exchange medium to the several hinged sections, supply means for a heat exchange medium for the remaining sections, and means for delivering the liquid to the several sections.

13. A heat exchanger for liquids such as milk comprising superposed tiers of sections, each tier comprising a plurality of sections which normally stand close together side by side, hollow hinges by which the sections of the lower tier are hinged to swing about horizontal axes toward and from each other, the sections of another tier being mounted to move rectilinearly toward and from each other, said hollow hinges forming passages for a heat exchange medium to the several hinged sections, supply means for a heat exchange medium for the remaining sections including separable connections between adjacent sections, and means for delivering the liquid to the several sections.

14. A heat exchanger for liquids such as milk comprising superposed tiers of sections, each tier comprising a plurality of sections which normally stand close together side by side, means for mounting the sections of the lower tier to swing toward and from each other about horizontal axes, means for mounting the sections of another tier to move laterally rectilinearly toward and from each other, separate means for supplying a heat exchange medium to the several sections of different tiers, and means for delivering the liquid to the several sections.

15. A heat exchanger for liquids such as milk comprising superposed tiers of sections, each tier comprising a plurality of sections which normally stand close together side by side, means for mounting the sections of the lower tier to swing toward and from each other about horizontal axes, means for mounting the sections of another tier to slide bodily laterally toward and from each other, means for supplying a heat exchange medium to the several sections of the lower tier, means for supplying a heat exchange medium to the several remaining sections, and means for delivering the liquid to the several sections.

16. A heat exchanger for liquids, comprising a plurality of sections mounted to swing in vertical planes transverse to the sections to and from operative positions in which the sections stand close together side by side, means for flowing the liquid over the several sections when in said operative positions, and means for circulating a heat exchange medium through the several sections including flexible connections with the several sections which enable said swinging movements of the sections.

17. A heat exchange element for liquids composed of two opposed metal sheets only having complementary portions forming channels between the sheets and welded together face to face with the channels forming header passages at opposite ends of the element, and also circulating passages between and extending at an angle to the header passages and arranged in groups with the opposite ends of each group of passages communicating with said opposite header passages.

18. A heat exchange element for liquids composed of two opposed metal sheets only having complementary embossed channels and welded together face to face with the channels registering and forming header passages at opposite ends of the element, and also a zig-zag circulating passage between and communicating at its opposite ends with said opposite header passages, said zig-zag passage having parallel portions joined end to end and extending at right angles to said header passages.

19. A heat exchanger for liquids, comprising superposed tiers of sections, the sections of each tier being movable to and from operative positions in which they stand side by side, the movements of the sections of at least one tier being swinging movements in vertical planes transverse to the sections, means which supply a heat exchange medium to the sections and are operable to permit said movements of the sections, and means for delivering the liquid to the sections when in their operative positions.

HARVEY FELDMEIER.